US 8,287,382 B2

(12) United States Patent
Holloway et al.

(10) Patent No.: US 8,287,382 B2
(45) Date of Patent: *Oct. 16, 2012

(54) ROLE BASED GAME PLAY ON A SOCIAL NETWORK

(75) Inventors: Jason S. Holloway, San Francisco, CA (US); David Jon Castor, Woodside, CA (US); Oleg Tsiupka, Kharkiv (UA); Dmytro Kobylokha, Petrovskoye (UA); Thorpe A. Mayes, III, Norman, OK (US); Adrienne Marie Hunter, Seattle, WA (US); Conrad Thomas Spotts, Seattle, WA (US); Brian Hensel, Gaithersburg, MD (US)

(73) Assignee: Face It Applications, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/153,464

(22) Filed: Jun. 5, 2011

(65) Prior Publication Data
US 2011/0237335 A1    Sep. 29, 2011

Related U.S. Application Data

(63) Continuation of application No. 12/763,401, filed on Apr. 20, 2010, now Pat. No. 7,955,175, which is a continuation of application No. 12/641,301, filed on Dec. 17, 2009, now abandoned.

(51) Int. Cl.
*A63F 13/12* (2006.01)
*A63F 13/00* (2006.01)
*A63F 9/24* (2006.01)

(52) U.S. Cl. ........... 463/42; 463/9; 463/29; 273/317.1; 273/461; 709/203; 710/18; 715/706; 715/744; 715/757; 715/764

(58) Field of Classification Search ............ 463/1, 9–13, 463/16, 20, 25, 29, 40–43; 273/108.1, 145 R, 273/147, 141 A, 317.1, 351, 454–456, 460–461; 704/E15.047; 705/14.2, 14.64, 26, 35, 36 R, 705/37, 42, 77; 709/203–207, 216–219, 709/225, 227, FOR. 106, FOR. 111, FOR. 112, 709/FOR. 115, FOR. 122, FOR. 130, FOR. 131, 709/FOR. 132, FOR. 141, FOR. 148, FOR. 149, 709/FOR. 153; 710/18, 20; 715/200, 700, 715/706, 738, 744, 757–758, 762–764; 340/7.1, 340/7.2, 7.21, 7.28, 311.2, 426.21, 572.1–572.4, 340/825.29, 825.49; 902/10, 23; A63F 9/24, A63F 13/00, 13/12; G06F 17/00, 19/00
See application file for complete search history.

(56) References Cited

U.S. PATENT DOCUMENTS 6,866,587 B1    3/2005    Lane
(Continued)

OTHER PUBLICATIONS

Mob Wars, http://en.wikiepedia.orglwiki/Mob_Wars, accessed Dec. 15, 2009, 1 page.

(Continued)

*Primary Examiner* — Arthur O. Hall
(74) *Attorney, Agent, or Firm* — The Mueller Law Office, PC (57) ABSTRACT

The present invention is a method of providing role based game play on a social computer network. User inputs are received via a computer network from user computers. These inputs are stored in a memory, and at least a portion of the memory is located away from the user computers. A group of two or more characters for a single user are created based on inputs from a user. One or more of these characters is associated with a friend user on the social computer network. At least a portion of information related to an outcome from the game is displayed on a device of the single user. Finally, the single user controls all the inputs for the actions of their characters during the game.

17 Claims, 9 Drawing Sheets

U.S. PATENT DOCUMENTS

| | | | |
|---|---|---|---|
| 6,884,169 B2 * | 4/2005 | Tsuchida et al. | 463/31 |
| 7,311,608 B1 * | 12/2007 | Danieli et al. | 463/42 |
| 7,559,834 B1 | 7/2009 | York | |
| 7,620,902 B2 | 11/2009 | Manion et al. | |
| 7,632,186 B2 | 12/2009 | Spanton et al. | |
| 7,674,166 B2 | 3/2010 | Takahashi et al. | |
| 7,677,967 B2 | 3/2010 | Jessop et al. | |
| 7,702,728 B2 | 4/2010 | Zaner et al. | |
| 7,778,948 B2 | 8/2010 | Johnson et al. | |
| 7,788,323 B2 | 8/2010 | Greenstein et al. | |
| 7,794,315 B2 | 9/2010 | Sakaguchi et al. | |
| 7,849,043 B2 | 12/2010 | Woolf et al. | |
| 2005/0070359 A1 | 3/2005 | Rodriquez et al. | |
| 2005/0165891 A1 | 7/2005 | Moody et al. | |
| 2005/0192097 A1 * | 9/2005 | Farnham et al. | 463/42 |
| 2005/0227766 A1 | 10/2005 | Kaminagayoshi | |
| 2006/0068917 A1 * | 3/2006 | Snoddy et al. | 463/42 |
| 2007/0021200 A1 | 1/2007 | Fox et al. | |
| 2007/0129123 A1 | 6/2007 | Eryou et al. | |
| 2007/0190494 A1 | 8/2007 | Rosenberg | |
| 2007/0218965 A1 | 9/2007 | Tilston et al. | |
| 2008/0090659 A1 * | 4/2008 | Aguilar et al. | 463/42 |
| 2008/0096665 A1 | 4/2008 | Cohen | |
| 2008/0250332 A1 * | 10/2008 | Farrell et al. | 715/753 |
| 2009/0042629 A1 | 2/2009 | Yamashita et al. | |
| 2009/0070412 A1 | 3/2009 | D'Angelo et al. | |
| 2009/0075738 A1 | 3/2009 | Pearce | |
| 2009/0098940 A1 | 4/2009 | Sangberg | |
| 2009/0193077 A1 | 7/2009 | Horii et al. | |
| 2009/0327907 A1 * | 12/2009 | Estrada et al. | 715/739 |
| 2010/0017307 A1 | 1/2010 | Barbour et al. | |
| 2010/0035692 A1 | 2/2010 | Reville et al. | |
| 2010/0144444 A1 | 6/2010 | Graham | |
| 2010/0151940 A1 | 6/2010 | Borge | |
| 2010/0160038 A1 | 6/2010 | Youm et al. | |
| 2010/0216553 A1 * | 8/2010 | Chudley et al. | 463/42 |
| 2011/0300926 A1 * | 12/2011 | Englman et al. | 463/25 |
| 2012/0015745 A1 * | 1/2012 | Mooney et al. | 463/42 |

OTHER PUBLICATIONS

World of Warcraft, http://en.wikipedia.org/wiki/World_of_Warcraft, accessed Dec. 14, 2009, 18 pages.

NC Interactive, Inc., City of Heroes Going Rogue: Complete Collection Quick Start Guide, NCSoft, http://www.goingrogue.na.cityofheroes.com/en/, pp. 4-14.

NC Interactive, Inc. City of Heroes Game Manual, NCSoft, http://www.cityofheroes.com/game_info/official_guides/official_city_of_heroes_manual.htm., pp. 42, 49, 61, 89-90, 94, 104, 131, 133, 145.

* cited by examiner

ROLE BASED GAME PLAY ON A SOCIAL NETWORK

CROSS-REFERENCE TO RELATED APPLICATIONS

This application is a continuation of U.S. patent application Ser. No. 12/763,401, filed Apr. 20, 2010, which is a continuation of U.S. patent application Ser. No. 12/641,301, filed Dec. 17, 2009, which are incorporated by reference for all purposes.

FIELD OF THE INVENTION

The present invention relates to online, turn-based, role-playing, internet games that include social networking activities.

BACKGROUND OF THE INVENTION

Role Playing Games

Role Playing Games (RPGs) have existed in various forms throughout the modern history of gaming. One original popular RPG was the game Dungeons and Dragons, which allowed a player to develop a character through the course of game play. In an RPG, the user selects a command from various choices such as attack, use weapon, defend, or use magic. These commands are typically directed towards an enemy or group of enemy characters. The enemy characters direct similar commands toward the user. The choice of commands to be taken by the enemy characters is determined by a predetermined algorithm or decisions of a human moderator. In Dungeons and Dragons the moderator is known as the Dungeon Master. The commands of both the player and the enemy characters may further be affected by a random component whereby a command is executed from a list of potential commands based on a random selection process. In computer versions of RPGs, a computer controlled enemy will issue a command based on a computer generated algorithm to counter the user's command.

As the player uses a character, the user often gains experience points for the character that can be applied towards increasing attributes or skills of the character. Experience points may be related to a character's strength, intelligence, agility, accuracy, or other traits of the character. Experience points can also be gained through accumulation of virtual resources such as weapons, armor, or unique items that are acquired during game play. In some RPG's, the user can use the totality of the advancements of their character to increase the level or class of their character to become a more advanced unit. Sometimes these RPG's allow the user is to control more than one character and potentially have the ability to earn experience points for each character they control.

The RPGs have progressed to include online play between human controlled players across the Internet or other networks. In many cases, the online play involves multiple players, sometimes called a Massively Multiplayer Online Role Playing Game (MMORPG). In MMORPGs, individuals control their own characters and simultaneously interact with potentially hundreds or thousands of other users. This is typically done in a client-server model with the user downloading a client on their system, and then connecting with the server over the Internet to the game server. It can also be done without a downloaded client, but just through direct interaction with the server using a web browser or other interface. The characters develop in a method similar to those in previous RPGs but with the additional feature of allowing the user to have the option of forming groups or teams to complete missions and stages of play.

Social Networks

Social networks have created a type of Internet website that has gained in popularity and has become influential in pop culture. They help different types of people in relationships stay connected such as family, friends, business associates, or people with similar interests. These connections are created through a variety of tools and applications, including profiles, groups, photos, music, videos, messaging, instant messaging, internal system communications and the like. Examples of social network websites include Facebook, MySpace, Friendster and Linkedin. Through these websites, one can create online representations of real-world relationships that allow users to interact with each other. Users generally create a profile that will display personal information about the user, including displaying their interests, friends, photos, and background information. Users can also leave comments on their profile and other user profiles to share with others.

To join these websites, a new user can usually simply visit the website and create an account or an existing user can invite other people to join. Once a new user joins, whether through directly signing up for the site or by accepting a request to join from their friend or acquaintance, they typically create a profile of their own. After a user has joined, that user can link other users as friends (or connections) by searching for them using various parameters and then having an automated or personalized message sent to that user via the social network website.

Internet Games

Internet games are played online via the Internet and are distinct from the typical client-server online game as they are platform independent. The ideal Internet game only requires a web browser on a device or computer with the ability to input, such as a laptop computer or a personal digital assistant (PDA). These games are connected to a server that can apply complex rules and computations while allowing for player interactions over the Internet.

Some social networking websites, such as Facebook, allow for third-party developers to create Internet applications and games that can run within the Facebook website. These third-party applications are developed, owned and hosted by developers that are unrelated to Facebook, and they are typically displayed on the Facebook website within a Facebook page. Users add these applications or games to their profiles, and then can share the Internet application information with other users.

In some complex social networking games, connected friends actively participate in game play. These games require some input from the connected friends for continued play. This adds to the entertainment value of the game because it becomes a social activity with a user's friends.

BRIEF SUMMARY OF THE INVENTION

The present invention is a method of providing role based game play on a social computer network. User inputs are received via a computer network from user computers. These inputs are stored in a memory, and at least a portion of the memory is located away from the user computers. A group of two or more characters for a single user are created based on inputs from a user. One or more of these characters is associated with a friend user on the social computer network. At least a portion of information related to an outcome from the game is displayed on a device of the single user. Finally, the single user controls all the inputs for the actions of the characters during the game.

DETAILED DESCRIPTION OF THE INVENTION

The present invention provides a complex Internet game, and specifically an RPG, for play on a social network. Users playing this game enjoy complex results based on their inputs and have the ability to build, or develop complex strategy into the way they play the game. Strategy is essential to turn based games such as RPGs, which allow the user to become engaged over a series of turns and continued play. This is desirable because it provides an enhanced user game playing experience.

The present invention also provides continued play without input from connected friends. For example, a friend in the social network may be associated with a character in the RPG of the present invention, but that character is controlled only by the user during play. This allows for continued play without input from the connected friend. While counter-intuitive for a social game, this allows for continued play when a friend is offline, with the illusion that a friend is participating in the RPG.

Figure 1A:
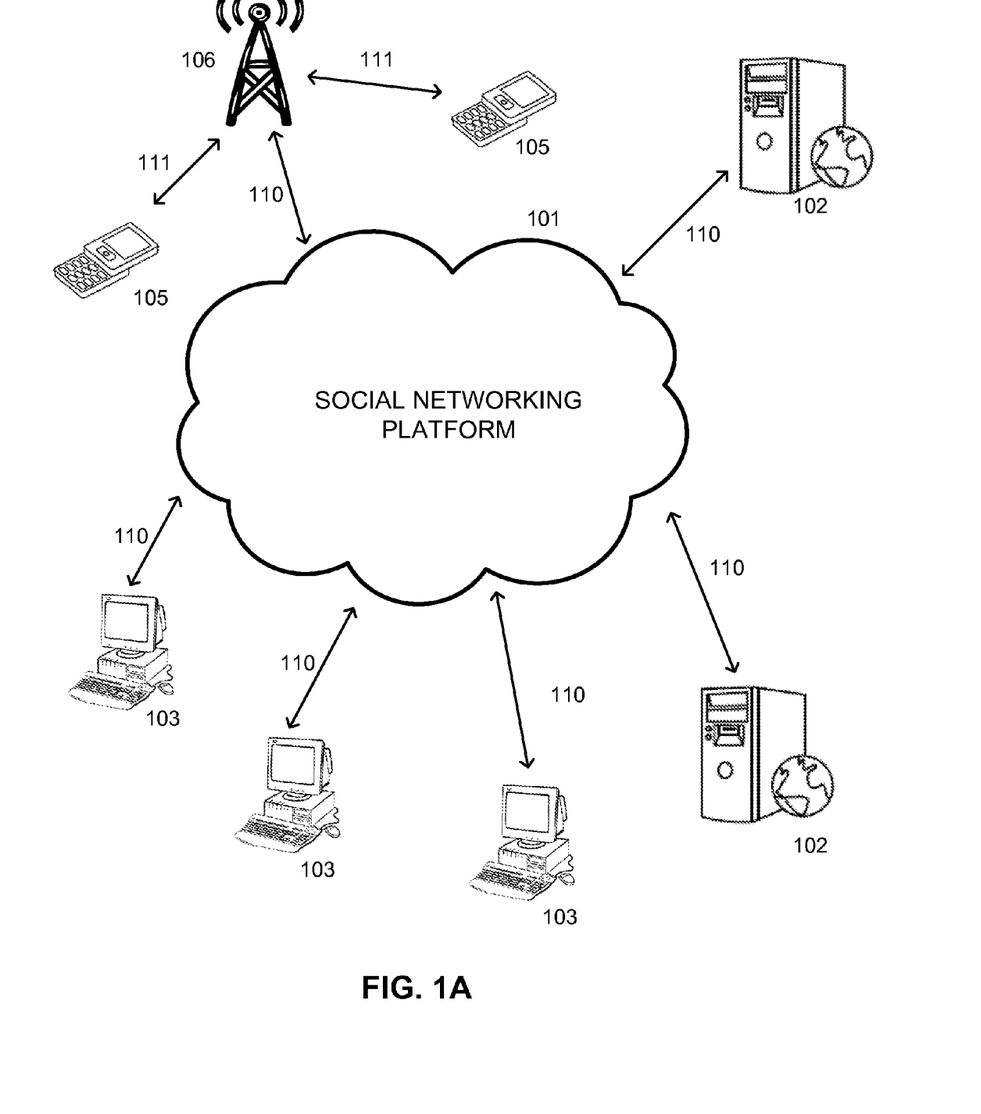
FIG. 1A illustrates an example of a network configuration of one embodiment of the present invention.

Internet based RPGs require an Internet system or other network. FIG. 1A is a network configuration of an online game system according to one embodiment of the present invention.

Multiple client computers terminals 103 are connected to a social networking platform 101 over a communication channels 110. Social networking platform 101 is any social networking system such as Facebook, Myspace or Friendster. It might also be a social network based on the iPhone or other communication network. Communication channels 110 may be, for example, an Internet connection. Client computer 103 may be any computing device capable of connecting through communication channel 110 and having a web browser, such as a Mac, PC or laptop. It might also be a mobile device such as an iPhone. The number of client computers 103 could be of unlimited number.

Multiple servers 102 are connected over communication channels 110 to social networking platform 101. Server 102 is any server capable of processing and storing data that is generated in the course of the game. The number of server 102 systems could be of unlimited number. Some communications and aspects of the system involve a social network, it is possible that other aspects of the communication occur directly between the server, or servers, and client, or client, systems without involving the social network. It is possible that the social network is used only briefly in the process for user authentification, lists of friends, sharing results or other content or for only limited aspects of the game.

Mobile devices 105 are connected over mobile gateways 111 to carrier 106. Carrier 106 is connected over communication channel 110 to social networking platform 101. Carrier 106 is any mobile phone carrier including CDMA, DEN, GSM, TDMA, UMTS, WIMAX, LTE and future mobile phone based networks. Mobile devices 105 are any mobile devices that connect to a carrier including mobile phones, personal digital assistants (PDAs), iPhones, Blackberrys, Android systems, Palm devices, netbooks, smartbooks, broadband devices, or any other device that connects to a carrier. Some communications and aspects of the system involve a social network, it is possible that other aspects of the communication occur directly between the mobile gateways, carriers and devices, or multiple gateways, carriers and devices, and client, or client, systems without involving the social network. It is possible that the social network is used only briefly in the process for user authentication, lists of friends, sharing results or other content or for only limited aspects of the game. Mobile devices 105, computer terminals 103 and the like are collectively referred to as user devices. Users include a single user playing the game or a friend user associated with the single user via the social network.

Figure 1B:
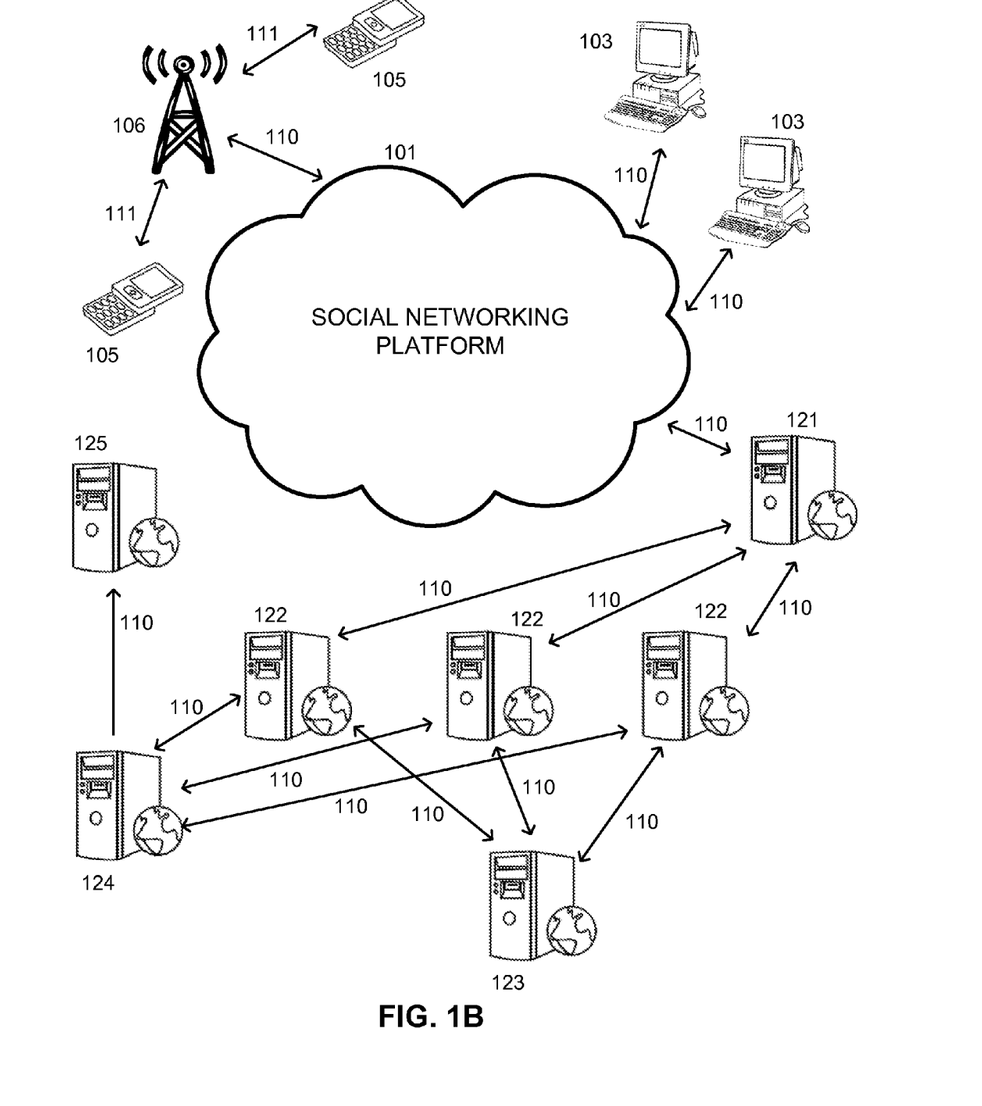
FIG. 1B illustrates an example of a network configuration of another embodiment of the present invention.

FIG. 1B is another embodiment of the network configuration of an online game system of the present invention. Other embodiments known to those skilled in the art may also be used for implementation of the present invention.

In this embodiment, multiple client computers terminals 103 are again connected to a social networking platform 101 over a communication channels 110. Mobile devices 105 are connected over mobile gateways 111 to carrier 106. Carrier 106 is connected over communication channel 110 to social networking platform 101.

Proxy server 121 is connected to social platform 101 over communication channel 110. Web servers 122 are connected over communication channels 110 to load balance server 121, Memcache server 123, and Database server 124. Database server 124 is connected over communication channel 110 to backup database server 125. Load balance server 121 is a server similar to server 102 that is capable of balancing the load amongst the multiple web servers 122. Web server 122 is a server similar to server 102 that is capable of processing multiple Internet programming languages. Memcache server 123 is a server similar to server 102 that is capable of storing temporary data for quick access by web server 122. Database server 124 is a server similar to server 102 that is capable of processing and storing database information related to the game. Backup database server 125 is a server similar to database server 124 that is capable of acting as a backup system for database server 124.

Figure 2:
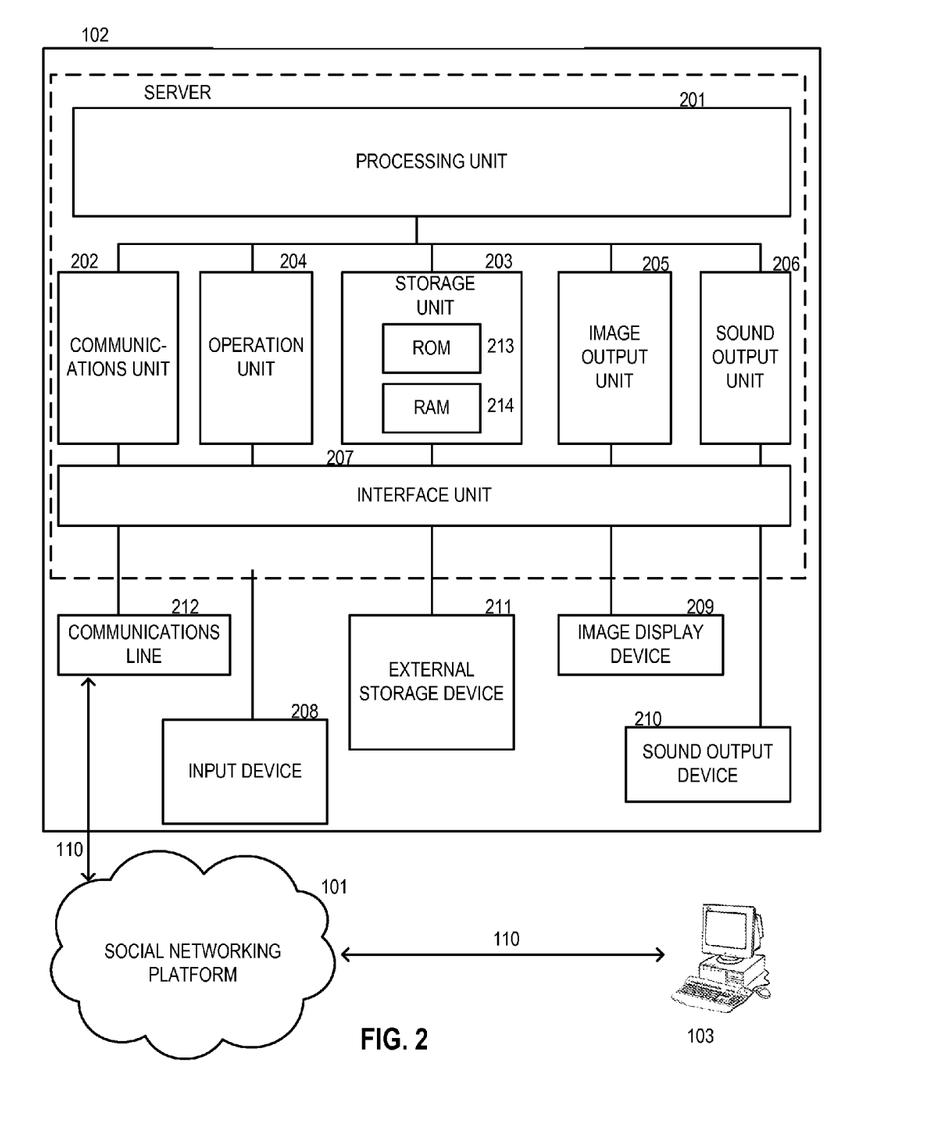
FIG. 2 illustrates an example of a configuration of a server.

FIG. 2 provides an example of server 102 according to the present embodiment. Server 102 internally includes a processing unit 201, a communications unit 202, a storage unit 203, an operation unit 204, an image output unit 205, a optional sound output unit 206 and an interface unit 207. The interface unit 207 transmits information to and from external devices from the internal components. The external devices connected through the interface unit 207 may include an optional input device 208, an image display device 209, an optional sound output device 210, an optional external storage device 211, and a communications line 212. The optional input device 208 may not be a single unit, and can consist of any device capable of inputting such as a keyboard, mouse, or similar input device. In one embodiment, input for server 102 can be done remotely. Image display device 209 is any device capable of display such as a monitor, PDA, mobile phone or any other electronic device. A user may personalize visual settings on display device 209. Optional sound output device 210 is any device capable of outputting sound such as speakers or a headphones jack. Optional external storage device 211 is any device capable of storage such as a hard drive, flash drive, storage server, or similar storage device.

The processing unit 201 processes information related to the game data. In the present embodiment of the invention, this information includes battle calculations, character level calculations, equipping characters, quest process, and any other information related to the game process. The processing unit 201 may also consist of multiple processing units working together. The communication unit 202 connects the server 102 and the communications line 212 through the interface unit 207. This connection controls the information that is sent and received between the server 102 and the social networking platform 101 over the communication channel 110.

Storage unit 203 may contain two types of memory components. Read only memory (ROM) 213 contains the system programs of the gaming system in according to the present embodiment. Random access memory (RAM) 214 is the re-writable storage area that stores the data generated by the processing unit 201. Optional external storage device 211 connects to the storage unit 203 through the interface unit 207. The storage unit 203 performs the processing of reading and writing the data stored in the optional external storage device 211 as needed by the processing unit 201.

Operation unit 204 creates the connection between the server 102 and the optional input device 208 using the interface unit 207. The operation unit performs the processing as needed for server 102 maintenance and analyzing data. The image display device 209 is connected to the image output unit 205 through interface unit 207, and the optional sound output device 210 is connected to the optional sound output unit 206 through the interface unit 207. The image output unit 205 processes data for server 102 that relates to visual data, and the optional sound output unit 206 processes acoustical data for server 102.

Figure 3:
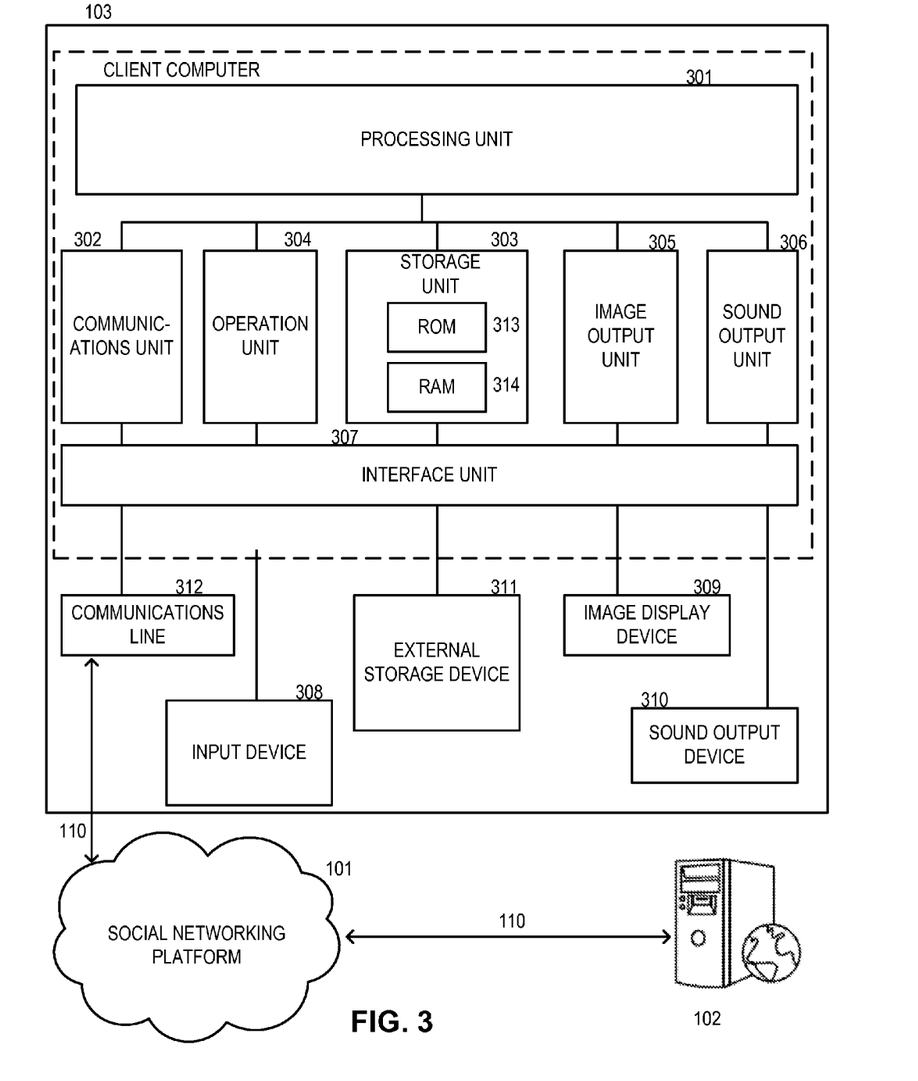
FIG. 3 illustrates an example configuration of a client computer.

FIG. 3 provides an example of client computer 103 according to an embodiment of the present invention. Client computer 103 internally includes a processing unit 301, a communications unit 302, a storage unit 303, an operation unit 304, an image output unit 305, a sound output unit 306, and an interface unit 307. The interface unit 307 transmits information to and from external devices from the internal components. The external devices connected through the interface unit 307 are an input device 308, an image display device 309, a sound output device 310, an external storage device 311, and a communications line 312. The input device 308 may not be a single unit, and can consist of any device capable of inputting such as a keyboard, mouse, or similar input device. Image display device 309 is any device capable of display such as a monitor. Sound output device 310 is any device capable of outputting sound such as speakers or a headphones jack. External storage device 311 is any device capable of storage such as a hard drive, flash drive, storage server, or similar storage device.

The processing unit 301 in the present embodiment processes data related to web browser received data for interaction with the user. The processing unit 301 may also consist of multiple processing units working together. The communication unit 302 connects the client computer 103 and the communications line 312 through the interface unit 307. This connection controls the information that is sent and received between the client computer 103 and the social networking platform 101 over the communication channel 110.

Storage unit 303 may contain two types of memory components. Read only memory (ROM) 313 contains the system programs for the client, and for the present embodiment, a web browser. Random access memory (RAM) 314 is the re-writable storage area which stores the data generated by the processing unit 301. External storage device 311 connects to the storage unit 303 through the interface unit 307. The storage unit 303 performs the processing of reading and writing the data stored in the external storage device 311 as needed by the processing unit 301.

Operation unit 304 creates the connection between the client computer 103 and the input device 308 using the interface unit 307. The operation unit performs the processing as needed for client computer 103 maintenance and analyzing data. The image display device 309 is connected to the image output unit 305 through interface unit 307, and the sound output device 310 is connected to the sound output unit 306 through the interface unit 307. The image output unit 305 processes data for client computer 103 that relates to visual data, and the sound output unit 306 process acoustical data for client computer 103.

Figure 4:
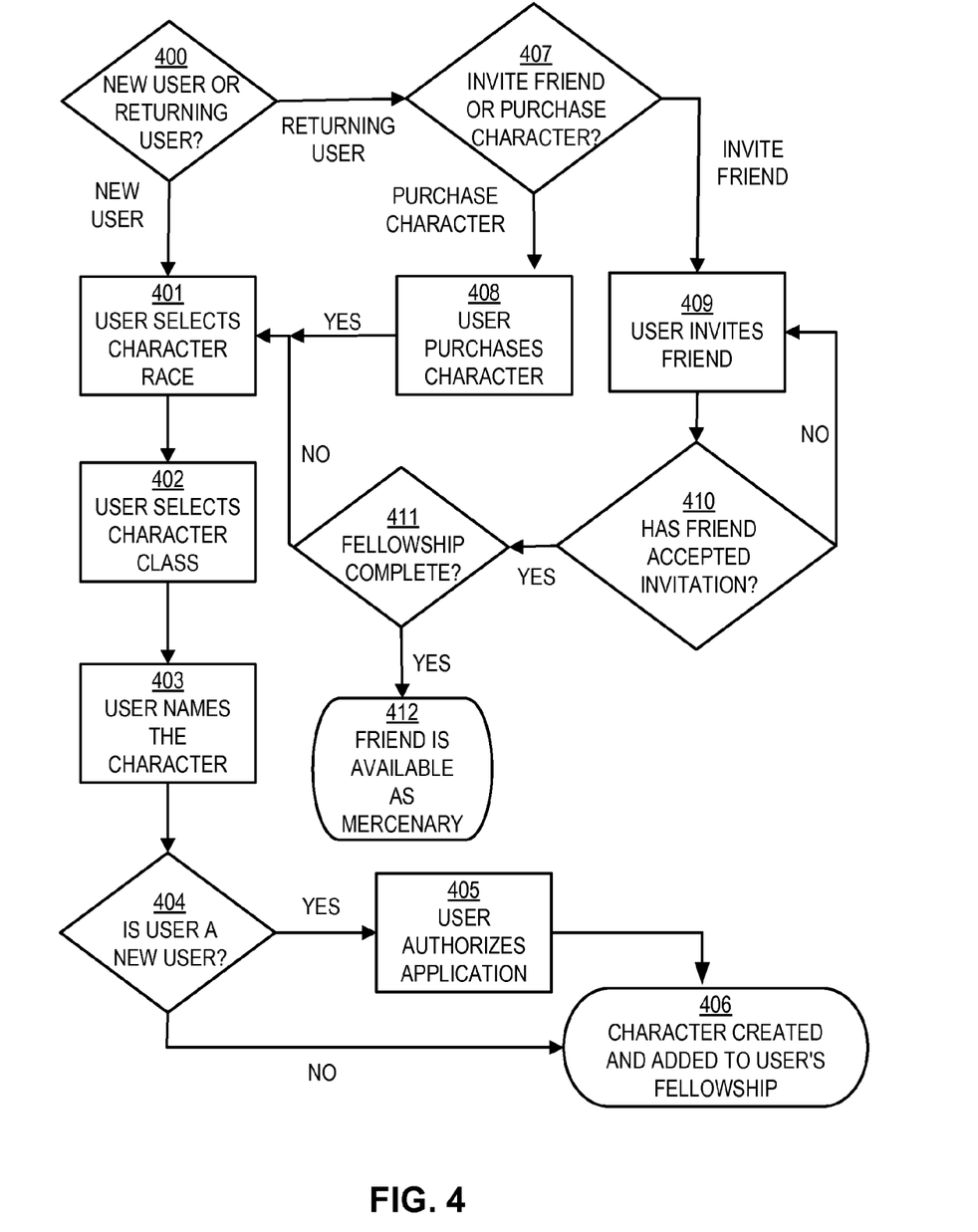
FIG. 4 is an overview process flowchart for the character creation of an embodiment of the present invention.

FIG. 4 is an overview process flowchart for a method of character creation for possible use in the present invention. At step 400, a determination is made whether or not the user is new to the game or a returning user. If the user is new, then they will begin the primary character process at step 401. Otherwise, the process will start for returning users at step 407.

For new users, the primary character is the character that is associated with the application's user. This is the first character that is created and is the first character in the user's group, which may also be referred to as a Fellowship for example purposes. When a new user comes to the game application, the first thing he does is create his character, this primary character. To do so, the user is first prompted to select a character category, such as Race, at step 401. Races may have attributes associated with them and may have broad classifications. For example, races may include Human, Elf, Faun, Undead, Troll, and Dwarf.

After selecting a character Race, the user may be prompted to select the Class of the character that is associated with the selected Race at step 402. Classes refer to specific character types, such as a Fighter, Mage, or Thief. Each class has attributes that are combined with the Race attributes to define the character. In an alternative embodiment, a user may be prompted to select a race or class, but not both. This single selection would then provide the attributes to define the character.

Thereafter, the user is prompted to pick a character name at step 403. At step 404, if the user is a new user, the system moves to step 405 and may request (e.g., via a pop up screen) the user to authorize the installation of the application on their social network profile. Authorization of an application allows that application access to the data about the user, which is stored by the social network. The primary character creation process is complete and that character is added to the user's Fellowship at final step 406. The character created may be recorded in a game log stored on the server as an achievement by the user for optional display in the user's profile on the social network. In other embodiments, the main character can be changed during the game, including class, race or name Returning users can create additional characters that are used to build their Fellowship. The number of characters required to complete the user's Fellowship may be a preset value. At step 407, a user is presented with the option to add characters to his Fellowship either by inviting friends to join his Fellowship and creating a character associated with the friend after the friend has accepted the invitation, or by purchasing additional characters to add to his Fellowship. In another embodiment, the additional characters can be "rented". In yet another embodiment, the additional characters can be purchased, traded or sold with other users or with intermediaries. In still another embodiment, the player is forced to add the additional characters and not given the option. In even another embodiment, the player is restricted as to when the other players may be added with requirements, such as a certain level or a task being accomplished in order to "unlock" the ability to add additional characters.

If the user elects to invite a friend to join his Fellowship at step 407, he sends the friend an invitation using the appropriate method prompted by the social network's internal system at step 409. If the friend accepts the invitation using the social network's internal system at step 410 and the user's Fellowship is not yet complete as resolved in the server database at step 411, then the user creates a new character for his Fellowship that is associated with the friend who accepted the invitation by starting the character creation process at step 401. If the friend does not accept the invitation at step 410, then the user can start the invitation process from step 409 once again with another friend. A user may also remove a character from his Fellowship. This may be done with or without notice to the user friend associated with that character.

If the user's Fellowship is complete as determined at step 411, then the friend who accepted the invitation is eligible to be a member of the user's mercenary force or some other ancillary group, and the process is complete at step 412. In other embodiments, whether a friend is a mercenary or a character can be changed later.

If the user elects to purchase a character at step 407, he does so by being prompted to purchase the character using stored virtual currency on the server and selecting the appropriate option at step 408. After purchasing a character to add to his Fellowship the user will create a new character that is associated with the purchased character by starting the character creation process at step 401.

The process of creating the new character for returning users is the same process as for creating the primary character: the user selects a Race for the character at step 401, the user selects a Class for the character at step 402, and the user names the character at step 403. The process continues as set forth above until the new character is added to the user's Fellowship and is stored in memory on the server and available to participate in quests. Again, at step 406, the characters created may be recorded in a game log stored on the server as an achievement by the user for optional display in the user's profile on the social network. This displaying may be customized by the user to provide personalized visual game settings for the user's enjoyment and convenience.

In another embodiment, the options for characteristics of the characters can be defined by other means such as by automation, through accomplishments in quests or ambushes, by friends directly (such as by friends directly assigning the characteristics) or indirectly (such as by friends accomplishing tasks), by other users directly or indirectly, through a financial transaction such as a purchase or transaction with another player, as the result of a project, puzzles, collections or other game tasks, by giving, receiving or trading "gifts" or other objects, or through other means that would be known to a person skilled in the art. It is possible that these characteristics could be added, subtracted, removed, traded or otherwise modified, so that characteristics are not subject solely to addition or improvement. In yet another embodiment, users can sell their characters, individually, or Fellowship, in its entirety, through the system or through an external system at any point after they are created, taking with them some or all of the attributes that are specific to that character or Fellowship.

Figure 5:
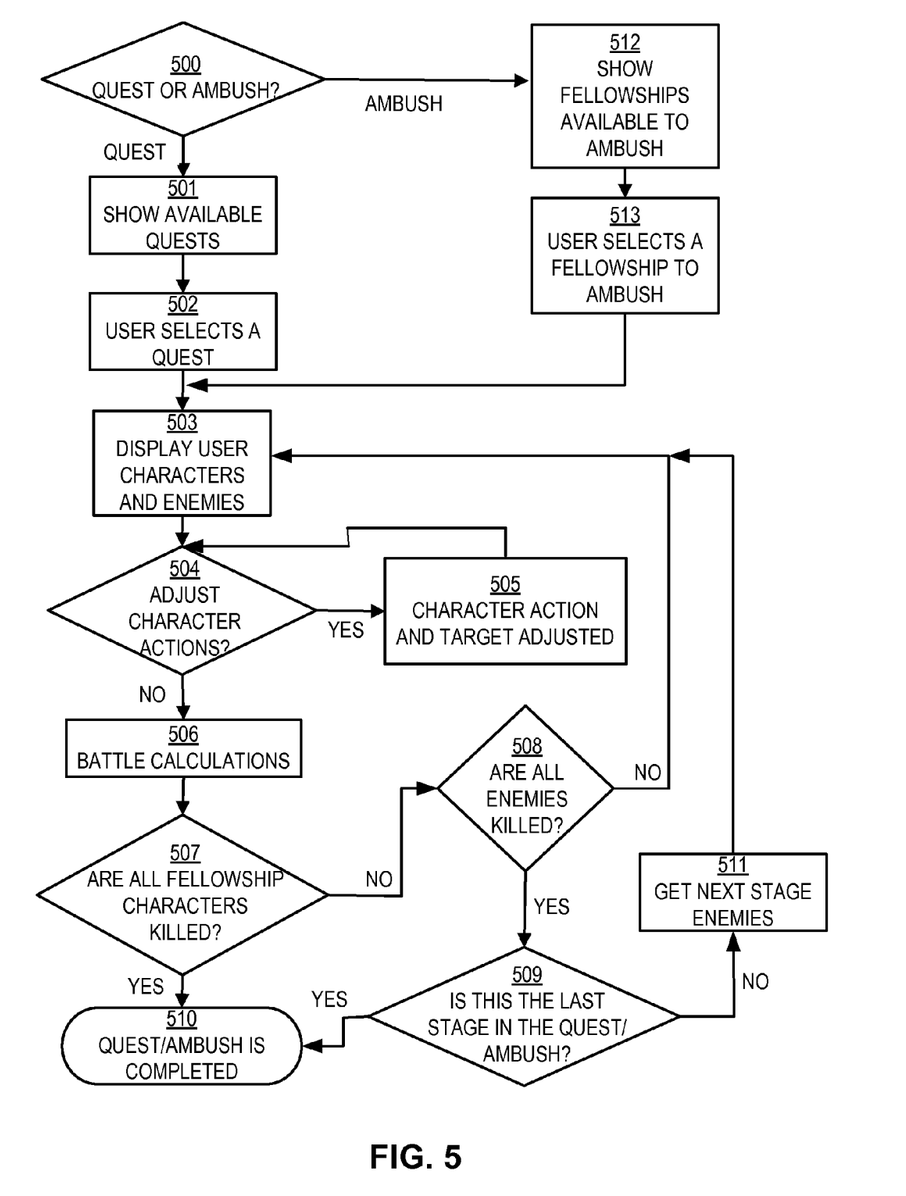
FIG. 5 is an overview process flowchart for the turn-based game play process of an embodiment of the present invention.

FIG. 5 is an overview process flowchart for a method the present system may use for turn based game play. Turn based game play may include quests, battles, ambushes, arena combat, team formation or a combination of these. In this embodiment of the present invention, a quest assignment is made up of one or more fights/stages. A quest may comprise a set of fights against multiple targets (enemies) that the user's Fellowship must defeat in order to complete the assignment. Users will be prompted at step 500 to fight targets that are a part of the game (also referred to as a quest), or they may elect to fight targets that are the characters in another user's Fellowship (also referred to as an ambush). In an optional arena embodiment, both sides of a battle are controlled by users (neither side is computer controlled) with two users setting up fights and battling each other through a series of turns. In an optional team embodiment, multiple single users, each individually a user (with a fellowship based on the description herein), join together to form an army of fellowships. There is no limit to the number of fellowships that might join to form such an army. These armies might then play in quests, ambushes or arena combat as described above. In an optional combination embodiment, armies may be formed both of computer controlled and user controlled fellowships and may battle in quest, ambush or arena combat against enemies that are also made up of a combination of computer controlled and user controlled fellowships. In another optional embodiment of the game, users define the engagements, including the enemies or the structure of the engagement, or both. In yet another optional embodiment of the game, the battle outcome is affected by a player or players selecting the positions of their characters, such as having some characters positioned "in front" or "in back" during the turn.

In quest and arena embodiments, the user's characters are fighting a set of enemies. The enemies in the quest option are generated from a pre-determined list of enemies that are stored on the game server. In one embodiment of the invention, the enemies in quest mode get increasingly difficult as the game progresses. The enemies in the ambush mode are comprised of other users' Fellowship character sets and may be of comparable skill as the current user's Fellowship. In both cases, in this example, the software controls the actions of the enemies. In contrast, the user may control all the actions of the characters in the users' Fellowship. In this way, the user may play the game when friend users are offline.

If the user elects to quest, they are shown a list of available quests at step 501 from which the user may input a selection at step 502. Thus, in this example, the user decides which quest he wants to attempt. The quests shown at step 501 may be based on the skill level of the characters in the user's Fellowship. In one embodiment, completed quests are excluded from the list. In another embodiment, the quests are unstructured and may be comprised of one step or more or of an undefined number of steps in which a user is allowed to continue to play as long as they want without the formal structure of a quest. In yet another embodiment, quests or their respective enemies, or both, are created by users.

If the user elects to ambush, then he is shown a list of available Fellowships to ambush at step 512. The user then inputs a selection on which Fellowship to ambush at step 513. The Fellowships available for ambush at step 512 may be based on the skill level of the characters in the user's Fellowship. In other embodiments, quests and ambushes might be combined into a single structured story or into a series of unstructured battles.

In one embodiment, the system starts the turn based play process at step 503 by displaying the user's characters and the enemies (also known as targets) they are fighting on the screen. Each turn until a quest or ambush is over begins at step 503. At step 504, the user may input the actions of each character and, depending on the action, the target of the action. The default mode if no input is entered is for the action of each character to be set to "attack" and the target to be set to the first enemy in the enemies being attacked. Actions the user can input in this example embodiment include attack, defend, use magic, and use item. It is through selecting actions for each character before each turn of play that the user influences the outcome of the battle and the ultimate outcome of the quest or ambush. This enhances the entertainment value of the game.

The user may input adjustments to his characters at step 505. He may also engage an enemy that initiates the battle calculations at step 506. These calculations may take into consideration-selected inputs (see FIG. 6 for additional explanation of battle calculations) that then determine the outcome of a battle (also referred to as an engagement).

In this embodiment of the invention, there are four possible outcomes of a turn. First, some of either the target's characters or the user's characters take damage, including being killed. Second, all of the target's characters in the battle are killed. Third, all of the user's characters in the battle are killed. Finally, all of the user's characters as well as all of the enemies are killed.

To decide what to do next, the system checks if all of the characters in the Fellowship are killed at step 507. If they are, then the quest/ambush is completed at step 510. The system then stores the results of the battle and adds information to the game log for optional display in the user's profile on the social network. If all the characters in the Fellowship are not killed, the system checks if all the target's characters are killed at step 508. If they are not, the system returns to step 503 and starts the engagement again. Thus, the next turn in the sequence begins.

If all of the enemies are killed at step 508, then the system checks if there are more stages in the quest or ambush to be fought at step 509. If it's the last stage in the quest or ambush and some of the user's characters are still alive, then the quest or ambush is complete and the user has won the quest or ambush. In this example, at step 510, the system stores the results of the battle and adds information to the game log for optional display in the user's profile on the social network.

If all of the target's characters are killed at step 508 and there are additional stages in the quest or ambush, then the enemies associated with the next stage are retrieved at step 511 and displayed along with the user's characters at step 503. Then, a new set of turns begins again at step 504. This is just one embodiment of the present invention, and in another embodiment, the system may use other factors to decide what to do on another turn of play.

Figure 6:
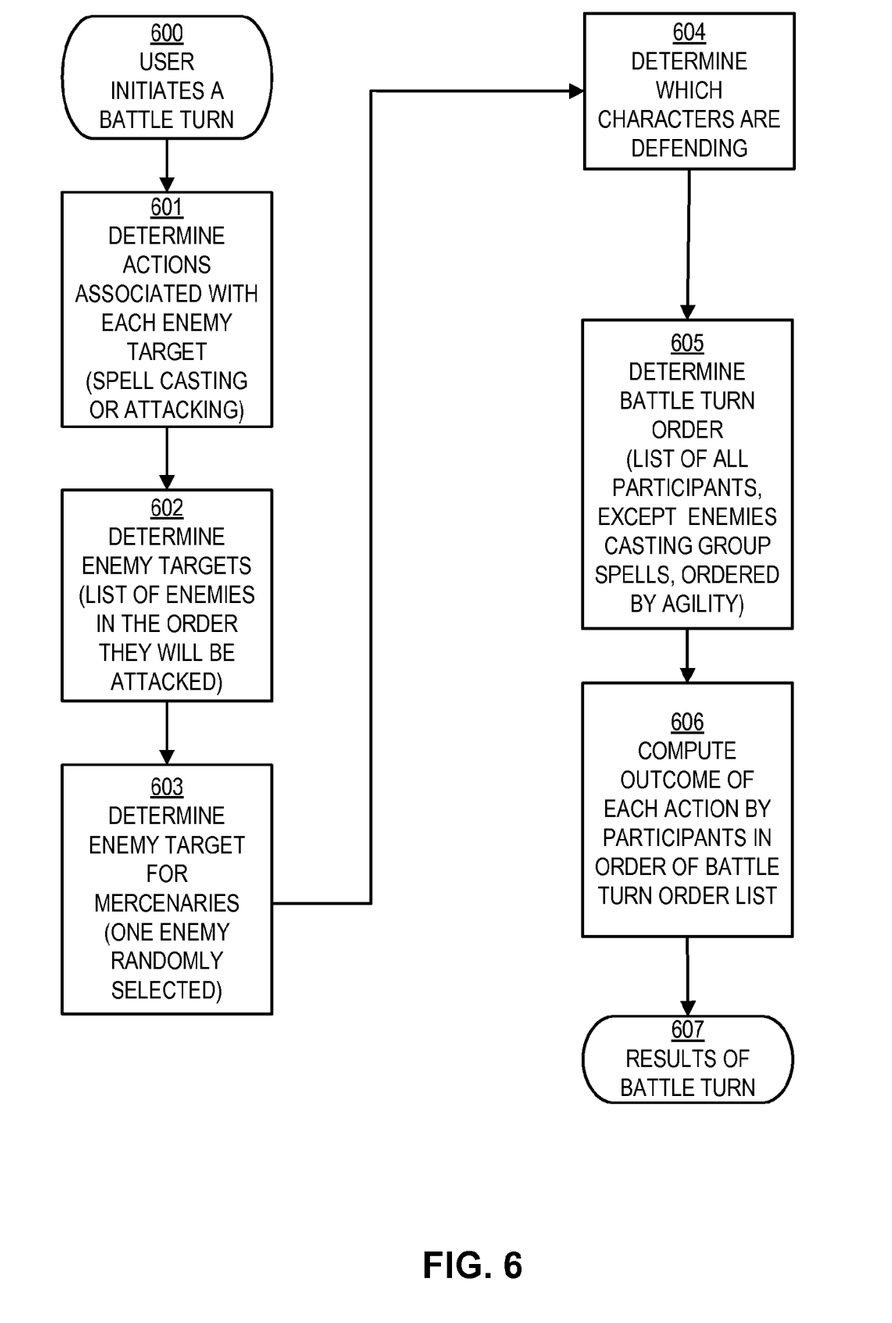
FIG. 6 is an overview process flowchart for the method of battle calculations of an embodiment of the present invention.

FIG. 6 is an overview process flowchart for battle calculations in one embodiment of the present invention. In this embodiment the process starts at step 600 when the user has initiated the battle on a specific turn. In another embodiment, some or all of the characteristics of a prior battle are carried forward to the next battle.

At step 601, the system determines what actions each of the different enemy characters will take. These may include spell casting, attacking, or other actions available to the enemy characters. At step 602, the system determines what order the user characters will be attacked. Thereafter, at step 603, the system determines what actions the mercenaries will take if mercenaries are available. In this embodiment, the system will randomly select an enemy character for the mercenaries to attack.

At step 604, the system determines which characters are defending the user's Fellowship. At step 605, the system determines the battle turn order. The order is based on the agility skill level of each character, which might be adjusted during game play. Thereafter, at step 606, the system computes the outcome of each interaction by the characters in order of the battle turn order list. This determines the effect of the battle turn on each character. For example, a character may be killed. Finally at step 607, the system adjusts each character's condition accordingly, stores that information on the server, and displays the results to the user on the display or screen.

Figure 7:
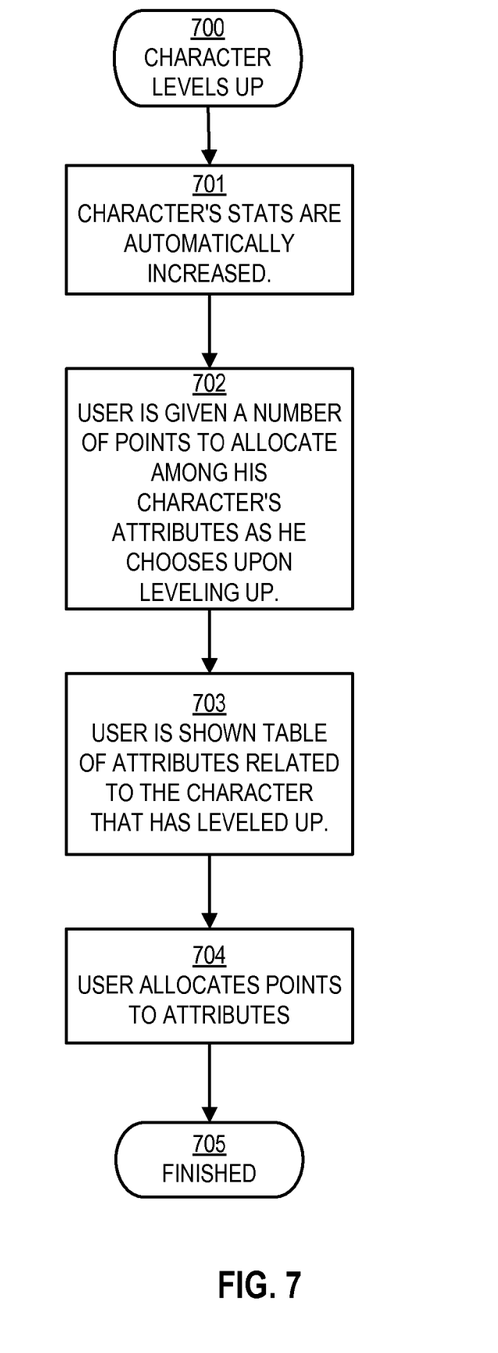
FIG. 7 is an overview process flowchart for the character leveling up process of an embodiment of the present invention.

FIG. 7 is an overview process flowchart for allocation of points after a character levels up in one embodiment of the present invention. When a user's character has earned enough experience points, the character's level may increase by, for example, one. In other words, the character "levels up". The system starts at step 700 when the user has entered this module of the game. When this happens, the system increases the value of the character's attributes by a pre-determined number of points at step 701. This number of points is based on the character's Race and Class, new level, and a random factor. A random number generating routine may determine the random factor.

In addition to the attribute value being increased automatically, the system presents the user a number of points that are set aside for the user to allocate among the character's attributes as the user chooses at step 702. This is an additional method that the user may have for influencing the outcome of later battles in the game. At step 703, the user is shown a table that lists the character's attributes for the character that has leveled up (e.g., maximum life, maximum mana, attack, defense, intelligence, dexterity, agility, maximum stamina, etc.) and the current values associated with each of them. At step 704, the user is prompted to input which attributes he would like to increase by spending points that the user has been allocated as determined by the system. Each available attribute has a system stored different point cost which the user may spend from the allotment of points in any way he chooses at step 704. The level up process is complete at step 705, and the results may be immediately displayed for the user. The system stores the results and adds information to the game log for optional display in the user's profile on the social network.

Figure 8:
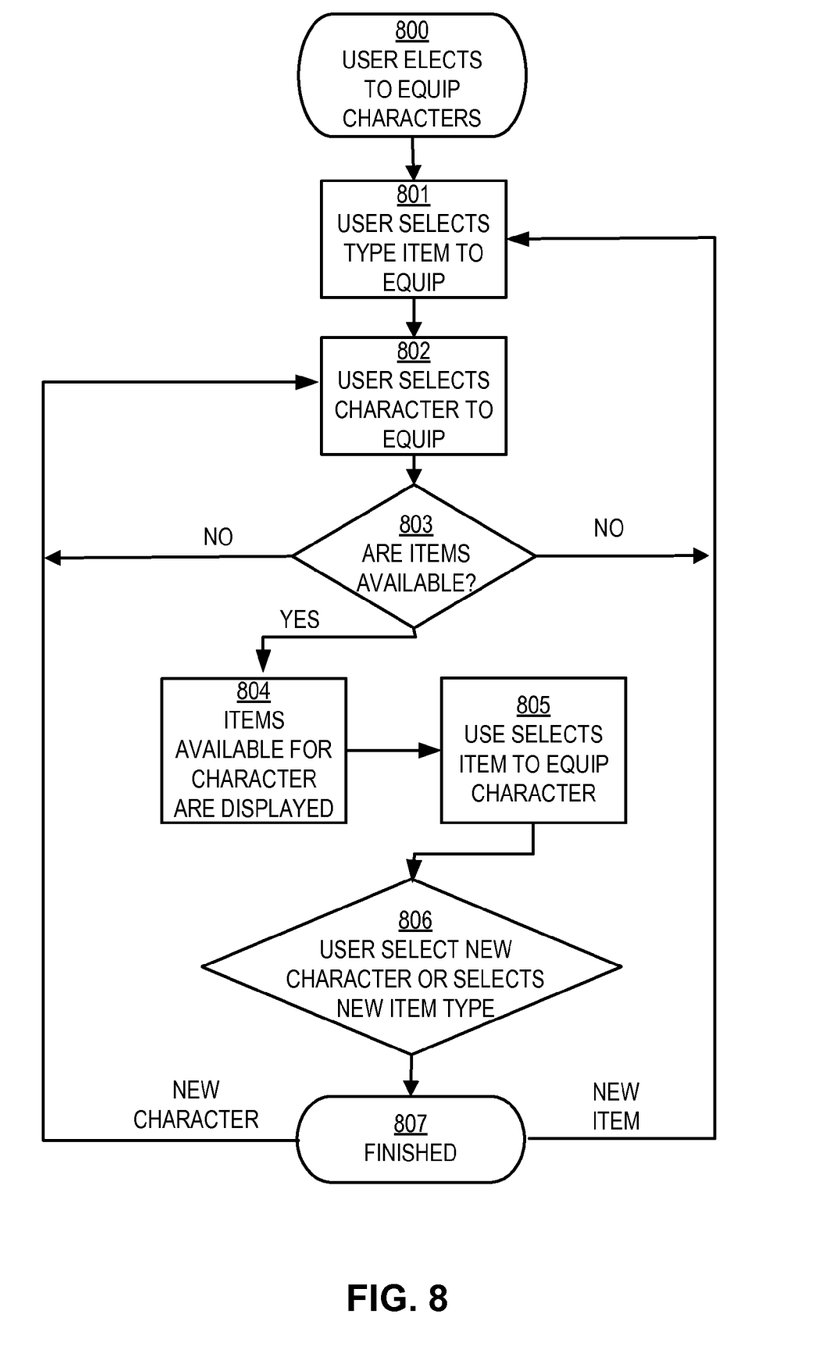
FIG. 8 is an overview process flowchart for the character equipping process of an embodiment of the present invention.

FIG. 8 is an overview process flowchart for the character equipping process of an embodiment of the present invention. Users can enhance their characters by upgrading their characters' attributes (e.g., attack and defense values) and by purchasing, finding, or building items that the character can use during battles to effect the outcome of the battle. In both cases, in this example, user choices affect the outcome of the game and the items that are available depend on the current level of the character and the character's Race and Class. Thus, not all items are necessarily available to all characters in a Fellowship. In another embodiment, the upgrades are created by users.

The process starts at step 800 when a user is prompted to elect to equip one or more characters in his Fellowship. At step 801, the user is prompted to select the type of item to equip, and then at step 802, the user is prompted to select which character to equip.

At step 803 the system will determine available item choices based on the inputs by the user from step 801, step 802 and the availability of virtual game currency. If the system determines the type of item selected is not available for the character selected, then the system will display an appropriate message at step 803. The user will then be prompted to either (i) select an item type again at step 801 or (ii) select a character to equip again at step 802. In one example, the system determines the type of item selected is not available for the selected character because the character is not at the required level, or the character is not of the correct Race and/or Class, or the user does not have enough game currency to purchase the item. Other inputs may determine that the item is not available. If the items from step 803 are available for the chosen character, the system presents the user with a list of the items available to purchase at step 804.

At step 805, the user will select the item to equip the character with. After equipping the character at step 805, the user will be prompted by the system at step 806 to either select a new item type to equip the selected character by returning to step 801, select a new character to equip by returning to step 802, or finish the character equipping process by going to step 807. At step 807, the system stores the results of the character equipping and adds information to the game log for optional display in the user's profile on the social network. In another embodiment, the sequence of steps the system takes will vary depending on the options the user selects. In yet another embodiment, the user can sell items or can carry more than one type of item for each character. In still another embodiment, the items can be shared amongst the characters and are not limited to use by only one specific character, but can be limited on what characters can use them.

Although embodiments of the invention have been discussed primarily with respect to specific embodiments thereof, other applications and variations are possible. For example, various configurations of input and output devices may be used in place of, or in addition to those described. Other variations can include, but are not limited to, competitive opportunities such as battles, jobs, quests, assignments, tournaments, races, fights, and competitions. Non-competitive opportunities might include but are not limited to, solving puzzles, creating objects (e.g., building a house or castle), organizing objects (e.g., building a town or kingdom), and solving problems in a simulated environment (e.g., growing a garden or running a business). Nothing in this specification should be read to limit the invention to an embodiment where the system is implemented on a single social network. The invention will function with any social network that allows game applications. The system can function outside of a social network. The system could function within multiple social networks, simultaneously or not. The invention is not limited to users with access to a device disclosed in this patent application The invention may perform, at times, before and after the social network function, entirely independently from a social network. It is possible that the social network aspects will be used after a period of use without the social network, or that the invention will be used independent of a social network after the use of the social network. It is possible that the invention will be used periodically at varying times and for varying periods of time with the social network, as it may function off-line. Functions may be performed by hardware or software, as desired. In general, any diagrams and process flowcharts presented are only intended to indicate one possible configuration, and many variations are possible. Those skilled in the art will also appreciate that methods and systems consistent with the present invention are suitable for use in a wide range of applications. While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims. Furthermore, those skilled in the art will appreciate that the foregoing description is by way of example only, and is not intended to limit the invention.

The invention claimed is:

1. A method of providing role based game play in a role based game on a social network, comprising the steps of:
   a. receiving inputs via a computer network from user devices;
   b. storing the inputs in a memory, at least a portion of the memory being located remote from the user devices;
   c. a single user inviting a friend user with a method provided by the social network to join as a character in the role based game, wherein the friend user becomes associated with the character and wherein the friend user is originally befriended based on similar personal or professional interests using the method provided by the social network,
   d. the single user utilizing a group of two or more characters for a stage of play in the role based game, the characters including the character associated with the friend user; and
   e. displaying at least a portion of information related to an outcome from the role based game play on a device of the single user, the device being one of the user devices;
   f. wherein the single user controls one of more actions or characteristics of the character associated with the friend user by inputting the actions or characteristics of the character associated with the friend user at the device, and wherein at least one of the actions and the characteristics are utilized for the stage of play such that the single user plays the game with the character associated with the friend user when the friend user is offline and without input from the friend user; and
   g. wherein the social network has a main focus of building social networks around people by allowing friends, family and others to share personal and professional interests, and the social network provides a platform for the role based game and for other social network applications.

2. The method of providing role based game play on a social network of claim 1, wherein the characteristics are complex and assigned.

3. The method of providing role based game play on a social network of claim 1, wherein the characteristics are based only on inputs from the single user.

4. The method of providing role based game play on a social network of claim 1, further comprising the step of providing multiple turns of play for the single user, the turns of play including simulated action of the group of the characters.

5. The method of providing role based game play on a social network of claim 4, wherein the single user has the option of changing the characteristics of the characters during each of the turns of play.

6. The method of providing role based game play on a social network of claim 5, wherein the changing of the characteristics of the characters impacts the outcome of the turn of play.

7. The method of providing role based game play on a social network of claim 4, further comprising the step of providing multiple possible outcomes for each of the turns of play based at least in part on the inputs from the single user.

8. The method of providing role based game play on a social network of claim 1, wherein a system determines the actions of one or more of the characters in the group.

9. The method of providing role based game play on a social computer network of claim 1, wherein the single user is associated with another character in the two or more characters.

10. The method of providing role based game play on a social network of claim 1, wherein the actions are based only on inputs from the single user.

11. The method of providing role based game play on a social network of claim 1, wherein the single user has the option of removing one of the characters from the group.

12. The method of providing role based game play on a social network of claim 1, wherein the single user controls all of the actions and the characteristics of the character associated with the friend user during the stage of play.

13. The method of providing role based game play on a social network of claim 1, wherein the stage of play includes a fight.

14. The method of providing role based game play on a social network of claim 1, further comprising the step of creating the group based on inputs from the single user.

15. The method of providing role based game play on a social network of claim 1, further comprising the step of creating a second group.

16. The method of providing role based game play on a social network of claim 15, wherein the second group includes the character associated with the friend user.

17. The method of providing role based game play on a social network of claim 1, wherein the single user inputs all the actions and all the characteristics of the character associated with the friend user at the device.

* * * * *